Dec. 31, 1963  D. S. SCHWARTZ  3,115,779
DEVICE FOR MEASUREMENT OF HIGH TEMPERATURE
Filed Aug. 30, 1961  3 Sheets-Sheet 3

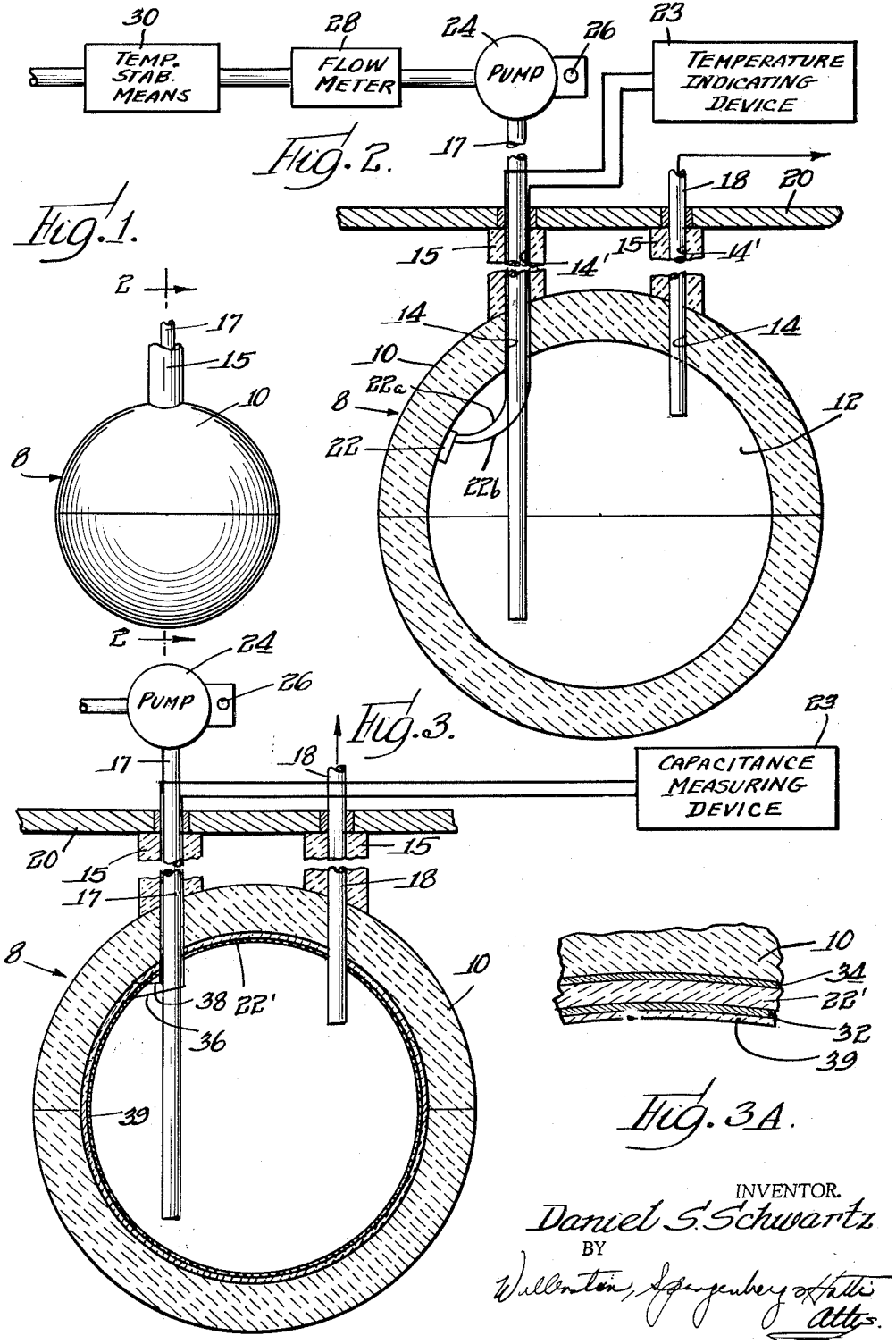

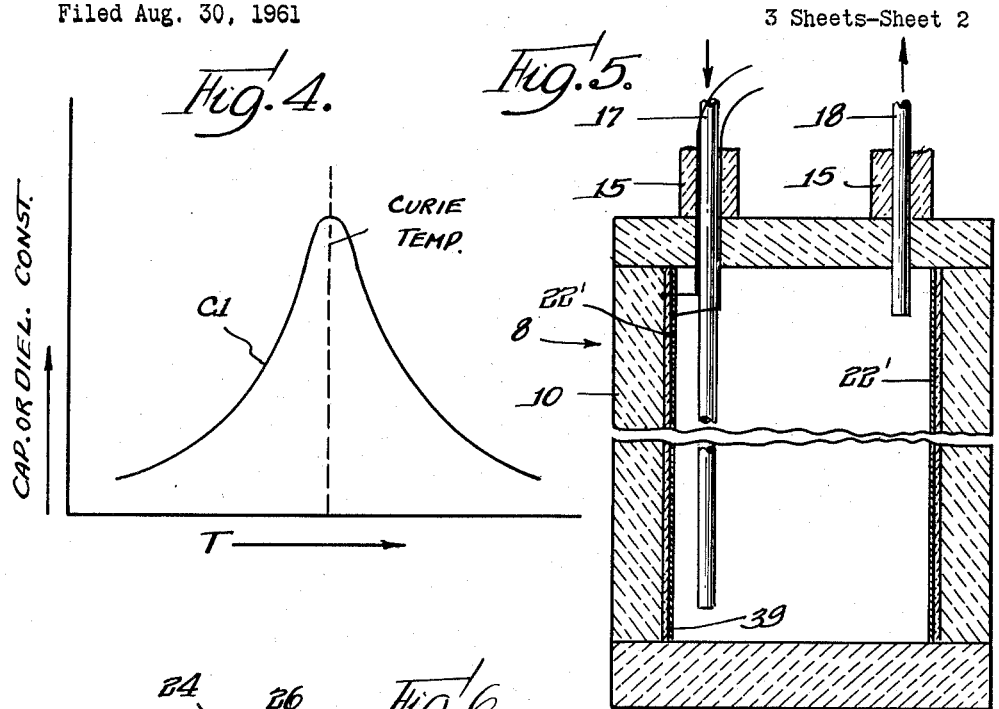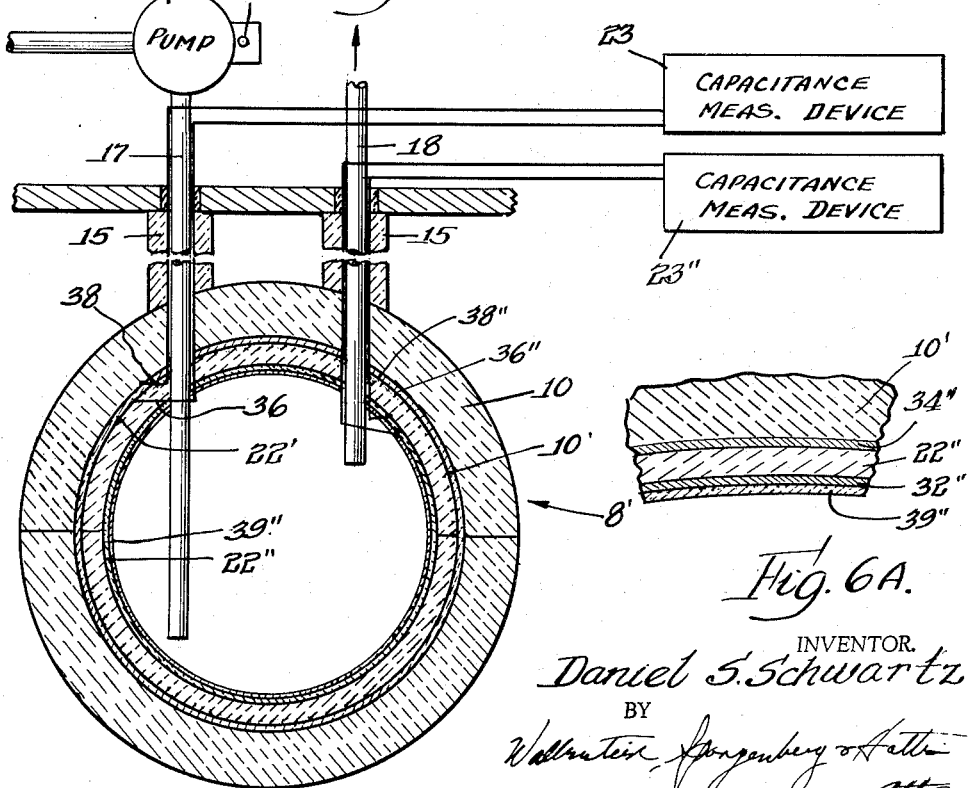

INVENTOR.
Daniel S. Schwartz
BY
Wallenstein Spangenberg & Hattis
Attys.

United States Patent Office

3,115,779
Patented Dec. 31, 1963

3,115,779
DEVICE FOR MEASUREMENT OF
HIGH TEMPERATURE
Daniel S. Schwartz, Nixon, N.J., assignor to Gulton Industries, Inc., Metuchen, N.J., a corporation of New Jersey
Filed Aug. 30, 1961, Ser. No. 135,027
15 Claims. (Cl. 73—362)

This application is a continuation-in-part of application Serial No. 762,881, entitled Device of Measurement of High Temperature, filed September 23, 1958, now abandoned.

This invention relates to an apparatus for the measurement of high temperatures and in particular to such an apparatus useful in environments wherein the apparatus is to be located at a point remote from the temperature indicating point.

Several techniques have been, heretofore, used in the measurement of high temperatures. These include the use of optical and radiation pyrometers, thermocouples and resistance thermometers, interferometers and pyrometric cones. All of these possess inherent disadvantages or limitations for measuring very high temperatures or temperatures in induction furnaces. For example, in optical pyrometers, stable clear optical paths are necessary which may not be readily obtainable due to the location of the high temperature environment involved. Thermocouples and resistance thermometers are not practical for temperatures above 1800° to 2000° F. and in induction furnaces where the problem of current induction produces undesired heating and spurious signals. Interferometers have numerous limitations including the difficulty in utilizing the same in induction furnaces. Pyrometric cones are useful only in providing single static temperature indications, so they cannot be used for continuous readings of varying temperatures.

Accordingly, it is an object of the present invention to provide high temperature measuring apparatus which do not have the disadvantages and limitations referred to above. More particularly, it is an object of the present invention to provide high temperature measuring apparatus which provides a temperature variable electrical characteristic which can be readily detected and measured at a point remote from the high temperature environment involved and, further, where the apparatus is useful at temperatures greatly in excess of the temperatures at which thermocouples and resistance thermometers have, heretofore, been used.

Another object of the present invention is to provide high temperature measuring apparatus as just described which can be utilized in induction furnaces. Still another object of the present invention is to provide apparatus as just described which can be readily utilized in extremely high temperature environments, and which is of relatively simple and rugged construction and can be used repeatedly for prolonged periods of time at such high temperatures.

Still another object of the present invention is to provide temperature measuring apparatus as described which can be mounted either completely within the high temperature environment involved or, in another form thereof, can be mounted within an opening in the wall of a container or housing for the high temperature environment involved.

The above and other advantages and objects of the invention will become apparent upon making reference to the specification to follow, the claims and the drawings wherein:

FIG. 1 is an elevational view of a spherical embodiment of the present invention;

FIG. 2 is a sectional view through FIG. 1, taken substantially along the line 2—2 therein and further including, in diagrammatic form, various elements which are connected to the apparatus shown in FIG. 1;

FIGS. 3 and 3A are views of a modified spherical form of the present invention constituting an improvement upon the embodiment shown in FIG. 2;

FIG. 4 is a graph showing the variation of dielectric constant (or capacitance) with temperature of a piezocapacitive temperature responsive element forming a part of the apparatus shown in FIG. 3;

FIG. 5 is a sectional view through a cylindrical embodiment of the present invention;

FIGS. 6 and 6A are views of a modified form of the spherical embodiment of the invention shown in FIG. 3;

Figure 8:
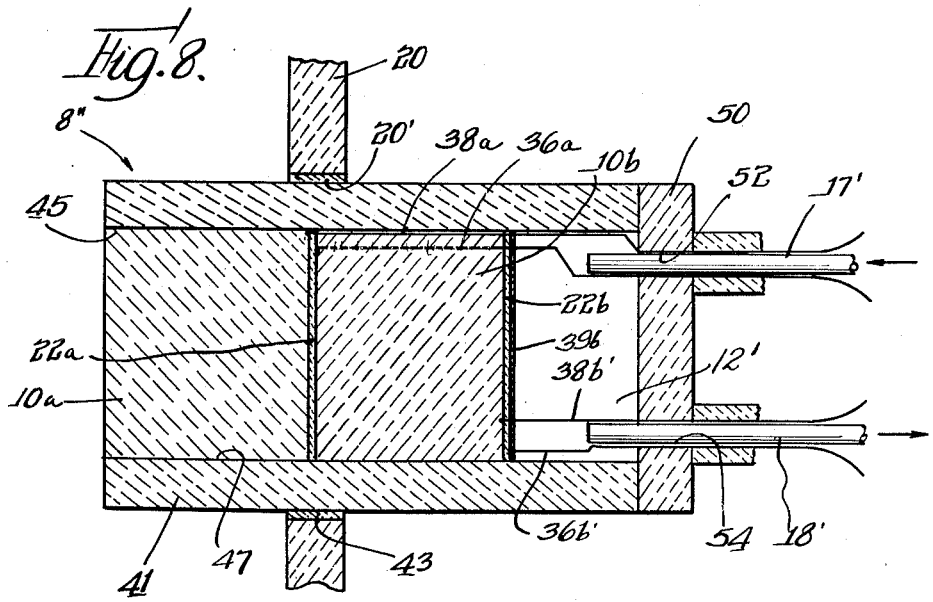
FIG. 8 is a sectional view through a still further modified form of the invention inserted in the opening in a wall surounding the high temperature environment to be measured.

Refer now to FIGS. 1 and 2 which illustrate a simple form of the present invention. A spherical temperature sensing unit 8 is shown which is inserted directly into the high temperature environment to be measured. Although the spherical shape illustrated is preferred, other shapes could be utilized. The unit 8 comprises a spherical hollow body or shell 10 most advantageously having relatively thick walls made of a high temperature refractory, such as alumina, mullite, or the like. These materials are relatively poor conductors of heat and electricity over the range of temperatures to be measured. For example, mullite has extremely high heat and electrical qualities for temperatures well in excess of 5000° F.

The shell 10 has a spherical cavity 12 therein. A pair of spaced bores 14—14 extend through the walls of the shell 10. A pair of cylindrical bushings 15—15 preferably made of the same material as the shell 10 project from the outer surface of the shell 10 and the bushings have bores 14'—14' forming extensions of the shell bores 14—14. The bushing could be made integral with the shell, but are shown as originally separate elements affixed to the shell 10 by a suitable cement which may be Sauereisen or other high temperature cement. The spherical shell 10 may be initially made from two hemispherical body halves which are cemented together by a suitable refractory cement.

Pipes 17 and 18 are shown extending into the cavity 12 of the shell 10 through the bores 14—14 and 14'—14'. The bushings 15—15 serve to insulate the pipes 17 and 18 from the surrounding high temperature and, when the temperature sensing unit 10 is mounted in a temperature environment the ends of the bushings extend against a wall 20 surrounding the high temperature environment involved. The pipes 17 and 18 extending through the aforesaid bores and wall 20 respectively carry a coolant into and out of the cavity 12 so that the defining walls of the cavity are at a temperature much lower than the temperature on the outside of the shell 10. The magnitude of the temperature gradient is increased by using thicker walls for the shell 10 and a material having greater heat insulating qualities. Where the temperature to be measured is expected to vary over short time intervals, the shell wall thickness can be such as to provide too long a time constant to enable the cavity temperature to catch up with the variation in the outside temperature. In such case, a thinner wall thickness and/or a higher heat conductivity material is used. However, the cooling problems become more severe in the latter case. It is readily possible for high temperature environments of the order of 5000° F. to reduce the temperature on the inside of the shell to the order of 100° C.

A temperature responsive element 22 is positioned within the cavity 12 to measure the temperature thereof. From data on the thickness of the shell walls, the temperature indicated by the temperature responsive element 22, the rate of flow and the temperature differential of the incoming and outgoing coolant, the temperature on the outside of the shell 10 can be calculated from well known heat flow equations. However, it is more convenient to determine the outside temperature by calibration procedures to be explained later on in the specification.

The temperature responsive element 22 shown in FIG. 2 is a thermocouple having a pair of leads 22a and 22b respectively extending through the bores 14—14 and 14'—14' on the outside of the pipes 17 and 18. The leads 22a and 22b extend to any suitable temperature indicating device 23 which responds to the voltage output of the thermocouple. The device 23 may be calibrated in temperature units to indicate the temperature of the cavity 12 directly. The temperature and rate of flow of the incoming coolant flowing in the inlet pipe 17 is selected to provide a temperature within the cavity 12 in a range at which the thermocouple or other temperature responsive element 22 is operative. The temperature on the outside of the shell 10 can thus be far in excess of the temperature at which the thermocouple or other temperature responsive element is operative.

The inlet pipe 17 extends to the output of a pump 24 having an adjustable control knob 26 for controlling the rate of flow of fluid in the pipes 17—18. A flow meter 28 is provided for indicating the rate of flow of the coolant. The temperature of the incoming coolant is fixed at a given temperature by any suitable temperature stabilizing means 30 well known in the art.

Utilizing the equipment shown in FIG. 2, two possible calibration procedures can be followed. In one of these procedures, the temperature sensing unit 8 is subjected to a number of different predetermined calibration temperatures distributed throughout the range of temperatures at which the unit is to be utilized to measure unknown temperatures. At each calibration temperature, the inlet coolant temperature and the coolant flow rate is adjusted to a fixed value and the temperature in the cavity 12 for each calibration temperature measured by the temperature indicating device 23 is noted. A calibration curve can then be drawn where one of the scales of the curve represents the calibration temperature on the outside of the shell 10 and the other scale represents the temperature in the cavity 12. When the unit 8 is later placed in an unknown temperature environment, a point on the calibration curve is located corresponding to the temperature of the cavity 12 and the curve then gives the outside temperature provided the inlet coolant temperature and coolant flow rate are adjusted to the values used during the calibration procedure.

Another method of calibrating the apparatus shown in FIG. 2 is to adjust the flow rate of the fixed temperature inlet coolant to a value which maintains a constant cavity temperature at the various calibration temperatures and to draw a curve from the outside temperature and flow rate values involved. This calibration curve will then give the value of an unknown outside temperature from the flow rate required to maintain the fixed calibration temperature in the cavity 12.

As previously indicated, the use of thermocouples and other similar heat sensitive elements is unsatisfactory for induction furnaces where the magnetic fields involved induce eddy currents in the metal portions of the thermocouple which cause significant excessive heating or otherwise disturb the output of the heat sensitive elements. To provide a temperature sensing unit 8 useful in a variety of environments including induction furnaces, other forms of the invention now to be described are utilized. One such form is illustrated in FIGS. 3 and 3A. This form of the invention is identical to that shown in FIG. 2 except that the thermocouple 22 is replaced by a thin lining 22' of an insulation or semi-conductor material which offers a high resistance to eddy currents and which provides an electrical output which varies with temperature and is substantially non-responsive to pressure variation. The lining 22' is made very thin relative to the thickness of the walls of the shell 10 so that only an insignificant temperature gradient exists across the lining 22'.

Another advantage of using a lining of temperature responsive material rather than a thermocouple or the like is that the temperature responsive element is distributed throughout the shell cavity 12 and thus produces a response which is dependent on the average temperature within the cavity. It is possible for hot spots to develop within the cavity so that substantial errors could be introduced if, for example, the thermocouple were located at such a hot spot.

Ferroelectric materials are especially useful as the lining material, especially non-polarized barium titanate and lead-zirconate titanate materials which have excellent temperature responsive capacitive qualities. It is, however, important to hold the temperature of these materials below their Curie point temperatures. (Barium titanate has a Curie point of approximately 120° C. and lead-zirconate titanate has a Curie point of about 325° C.) If the Curie point temperatures of these materials is exceeded, an ambiguity in the temperature indication of the capacitance characteristics of the titanate material will be present. This is illustrated by the curve C1 in FIG. 4 wherein the ordinate scale represents the dielectric constant (or capacitance) of the titanate material and the abscissa represents temperature. It will be noted that as the temperature is increased from zero, the dielectric constant or capacitance of the material reaches a peak where further increase in temperature results in a decrease in dielectric constant (or capacitance). The peak of the curve occurs at the Curie point temperature and will obviously provide ambiguity in the temperature indicated by a given capacitance measurement unless one knows on what side of the peak of the curve the temperature involved is located. Therefore, the temperature for the coolant in the inlet pipe 17 (and/or the rate of coolant flow) is selected which will assure a temperature of the temperature responsive capacitive lining 22' below the Curie point temperature. Preferably, the temperature is selected so that the maximum expected temperature to be measured is near the Curie point temperature where the capacitance sensitivity of the titanate material is greatest as indicated by the steepness in the slope of the curve C1 in the segment of the curve immediately below the peak thereof.

The lining 22' is provided with thin metal electrodes 32 and 34 on the inner and outer surfaces thereof which represent the plates of the capacitor whose dielectric is the body of the titanate material involved. The lining 22' in the form of the invention shown in FIGS. 3 and 3A may be applied to the shell 10 by cementing flexible, thin sheet metal coated titanate material to the cavity walls of the two halves of the shell 10 before they are cemented together or by spraying the conductive and titanate layers thereon. Electrical interconnections (not shown) between the hemispherical halves of the electrodes 32 and 34 of the lining can be made before assembling the halves of the casing 10 by wires soldered between the corresponding electrode layers forming the electrodes.

Conductors 36 and 38 respectively extend from the lining electrodes through the respective casing bores 14—14 and 14'—14' to a capacitance measuring device 23. The capacitance measuring device 23 serves the same purpose as the thermocouple 22 in the form of the invention shown in FIG. 2, and the capacitance measuring apparatus may be calibrated in the manner previously described. The thinness of the electrodes 32 and 34 and conductors 36 and 38 is such that eddy current problems present in induction furnace applications are negligible.

The movement of the coolant through the shell cavity 12 over prolonged periods can wear away the temperature responsive lining 22'. To maximize the life of the apparatus, the temperature responsive capacitive lining 22' can be protected by an inner lining 39 of heat and electrical insulating material which may be made out of the same material out of which the outer shell 10 is made.

The spherical shape of the temperature sensing unit 8 is distinctly preferred because of the symmetrical shape thereof which makes the positioning of the unit less critical than when non-symmetrical shapes are used. However, the elongated cylindrical shapes shown in FIGURE 5 is satisfactory for most purposes. The elements in this cylindrical form of the invention which correspond to the elements of the spherical form shown in FIG. 3 have been similarly numbered so that a description of the operation of the embodiment of FIG. 5 is unnecessary.

In all of the forms of the invention described up to this point, it is necessary to fix the inlet coolant temperature and in some cases measure the rate of flow of the coolant. Reference should now be made to a still further improved form of temperature sensing unit 8' shown in FIGS. 6 and 6A wherein it is not necessary to fix the inlet coolant temperature or measure the flow rate of the coolant although, as above indicated, it is still necessary to maintain the lining 22' below the Curie point temperature. In this form of the invention two direct temperature measurements are obtained at different levels of thickness of a shell assembly including the aforesaid outer shell 10 and an inner shell 10' made of the identical material as outer shell 10. Except where rapid response to temperature changes is necessary, the inner and outer shells are relatively thick to establish a large temperature gradient with a modest coolant flow rate. The aforesaid lining 22' is sandwiched between the inner and outer shells 10 and 10', and there is further provided a temperature responsive-capacitive lining 22'' on the inside surface of the shell 10' which lining may be made of the same titanate material as the outer lining 22'. A protective coating or lining 39'' of insulating material covers the inner surface of the lining 22'' to protect the same from the coolant.

The temperature responsive inner lining 22'' has inner and outer conductive coatings 32'' and 34'' to which conductors 36'' and 38'' are connected. The latter conductors extend on opposite sides of the outlet pipe 18 extending through the right hand bores 14 and 14' in the unit 8'. The corresponding conductors 36 and 38 associated with the outer lining 22' extend on opposite sides of the inlet pipe 17 passing through the bores 14 and 14' of the unit 8.

As previously indicated, the conductors 36 and 38 of the outer lining 22' extend to a capacitance measuring device 23. The conductors 36'' and 38'' associated with the inner lining 22'' extend to a capacitive measuring device 23'' similar to the device 23. The capacitance measuring devices are calibrated in temperature units by subjecting the unit 8' to various calibration temperatures without cooling the unit and waiting until the entire unit 8' has reached the calibration temperature. The reading on the measuring devices 23 and 23'' represent the calibration temperature involved.

Figure 7:
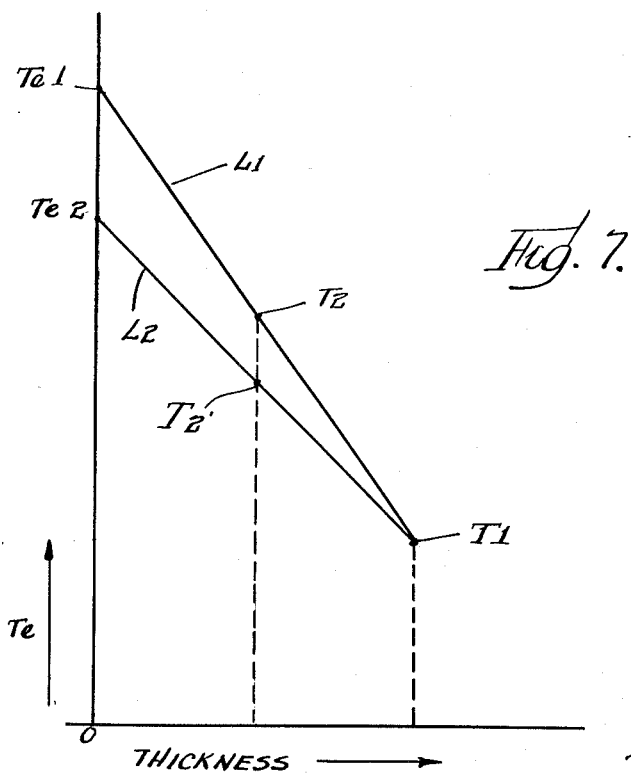
FIG. 7 shows curves illustrating the variation in temperature with thickness of the spherical high temperature measuring apparatus shown in FIG. 6.

The provision of two temperature responsive linings 22' and 22'' establishes two known temperatures at different points in the shell body made up of the shells 10 and 10'. Since the thickness of the inner and outer shells 10 and 10' are known, and the thickness of the linings 22' and 22'' are negligible, a curve can be drawn of the temperature distribution at two points in the shell body as shown in the graph of FIG. 7, where T1 is the temperature of the inner lining 22'' and point T2 is the temperature of the outer lining 22'. By drawing a straight line L1 through these two points and extending the line to the ordinate scale at the zero thickness point representing the outer surface of the outer shell 10, the temperature $Te1$ on the outside of the shell body is determined since the temperature distribution is a linear function. A second line L2 is shown in FIG. 8 representing a different outside temperature condition $Te2$. It is apparent from the slopes of lines L1 and L2 and the fact that the temperatures T2 are below the Curie temperatures (375° C. for lead-zirconate titanate and 120° C. for barium titanate) that temperatures $Te1$ and $Te2$ are not temperatures of the order of magnitude of 5000° F. If such were the case, the lines L1 and L2 would be so steep that the line could not be extended to the ordinate with graph paper of reasonable size. In such case, the point at which the lines contact the ordinate can be mathematically calculated in accordance with the following formula: where $t1$ and $t2$ are the thickness points of the inner and outer linings 22'' and 22', T1 and T2 are the temperatures of these points, and $Te$ is the outside temperature.

$$\frac{T_e - T_1}{t_2 - t_1} = \frac{T_2 - T_1}{t_1}$$

It is also possible to draw a calibration curve to determine the outside temperature of the temperature sensing unit 8 by fixing the temperature of the inside lining 22'' and measuring the temperature of the outer capacitive lining 22' for each calibration temperature. To this end, the inlet pipe 17 extends to the pump 24 having an adjustable flow rate control knob 26. For each calibration temperature, the knob 26 is adjusted to fix the temperature of the inner lining 22'' and a measurement is made of the temperature of the outer lining 22'. A curve is drawn with one of the scales of the curve representing the outside or calibration temperature and the other scale representing the temperature of the outer lining 22'. An unknown temperature on the outside of the temperature sensing unit 8' can be determined from the curve by adjusting the coolant flow rate to set the temperature of the inner lining 22'' to the calibration value and the temperature of the outer lining 22' indicates the outside temperature on the calibration curve.

The following are exemplary dimensions and conditions for a temperature sensing unit like that shown in FIG. 6 for measuring an outside temperature in the range of from 4,000° to 5,000° F.

Inner diameter of outer shell _ 0.564''.
Outer diameter of outer shell _ 1.000''.
Inner diameter of inner shell _ 0.500''.
Outer diameter of inner shell _ 0.560''.
Thickness of lead-zirconate titanate linings. _ 0.002''.
Inlet coolant temperature ____ Variable below 200° F.
Coolant flow rate _____ Adjustable to inlet temp.

The various temperature sensing units described up to this point are all positioned completely within the high temperature environments. Reference should now be made to a different application of the invention wherein the temperature sensing unit is mounted within an opening in the wall of the housing surrounding the high temperature environment. This is shown in FIG. 8 where the temperature responsive unit 8'' is mounted in a relatively large circular wall opening 20' where the high temperature environment is to the left of the wall 20. The unit 8'' includes an open ended cylindrical housing 41 having the same approximate size and shape as the opening 20'. A sealing gasket 43 is inserted between the housing 41 and the defining wall of the opening 20'. The housing 41 is made of a very low thermally conductive material, such as Planiton asbestos, so as to minimize the conduction of heat into the side of the housing. It is important that practically all of the heat be directed into the housing 41 through the opening 45 at the inner end of the housing. The housing 41 has a cylindrical bore 47 therein in the outer section of which is located a cylindrical slab or block of material 10a of a material which is a good heat and electrical insulator, such as mullite, alumina and the like. The slab 10a serves a similar purpose to the outer shell 10 previously described. Another slab 10b similar to slab 10a is mounted in the inner section of the bore 47. The coefficient of thermal conductivity of the slabs 10a and 10b is preferably much higher than the housing 41 so that heat flows directly through the unit 8″ in a longitudinal direction.

A thin cylindrical disc 22a of temperature responsive material, which may be the titanate ceramic materials referred to previously, is sandwiched between the slabs 10a and 10b. The titanate disc 22a has conductive coatings on the opposite sides thereof which are connected to conductors 36a and 38a. The conductors extend along spaced points between the slab 10b and the inner walls of the housing 41 and then through an opening at the outer end of the housing.

A cylindrical disc 22b of a material similar to disc 22a is secured in face-to-face contact with the outer face of the outer slab 10b, the disc 22b having conductive coatings on the opposite sides thereof to which are connected conductors 36b and 38b. A protective coating 39b protects the coated disc 22b.

A cavity 12′ for circulating a coolant is provided at the outer end of the housing 41 by a cup-shaped end cap member 50 suitably secured to the outer end of the housing 41. The end cap has a pair of openings 52 and 54 which respectively receive inlet and outlet pipes 17′ and 18′. The conductor pairs 36a—38a and 36b—38b extending to the discs 22a and 22b respectively extend around opposite sides of the pipes 17′ and 18′ to the temperature indicating devices (not shown in FIG. 8).

The operation of the embodiment of the invention just described is identical to that previously described in connection with the embodiment of FIG. 6.

It should be understood that numerous modifications may be made in the various forms of the invention described above without deviating from the broader aspects thereof.

What I claim as new and desire to protect by Letters Patent of the United States is:

1. A device for measuring temperatures comprising: a first body of material having a surface to be placed in contact with the high temperature to be measured and a surface which is isolated therefrom, a temperature sensitive element made of an electrical insulating material and which is thin relative to said body so that the temperature gradient thereacross is insignificant, said temperature sensitive element being in contact with the latter surface of said body, means for cooling the latter surface of said body to provide a temperature gradient across said surfaces, and means responsive to said temperature sensitive element for measuring the temperature of the adjacent surface of said body from which measurement the high temperature can be obtained in conjunction with other known quantities associated with said device.

2. A device for measuring temperatures comprising: a first body of material having a surface to be placed in contact with the high temperature to be measured and a surface which is isolated therefrom, a temperature sensitive element made of an electrical insulating material and which is thin relative to said body so that the temperature gradient thereacross is insignficant, a second body made of a material having the same thermal conductivity as said first body, said temperature sensitive element being sandwiched between said first and second bodies, means for feeding a coolant adjacent the surface of said second body remote from said first body to provide a temperature gradient across said bodies, and means responsive to said temperature sensitive element for indicating the temperature of the adjacent surfaces of said first and second bodies from which measurement the high temperature can be obtained in conjunction with other known quantities associated with said device.

3. A device for measuring temperatures comprising: a first body of material having a surface to be placed in contact with the high temperature to be measured and a surface which is isolated therefrom, a temperature sensitive element made of a ferroelectric material whose capacitance varies with temperature and which is thin relative to said body so that the temperature gradient thereacross is insignificant, said temperature sensitive element being in contact with the latter surface of said body, means for cooling the latter surface of said body to provide a temperature gradient across said surfaces, and to set the temperature of said temperature sensitive material below the Curie point temperature thereof, and means responsive to the capacitance of said temperature sensitive element for indicating the temperature of the adjacent surface of said body from which measurement the high temperature can be obtained in conjunction with other known quantities associated with said device.

4. A device for measuring temperatures comprising: a first body of material having a surface to be placed in contact with the high temperature to be measured and a surface which is isolated therefrom, a temperature sensitive element made of a ferroelectric material whose capacitance varies with temperature and which is thin relative to said body so that the temperature gradient thereacross is insignificant, said temperature sensitive element being in contact with the latter surface of said body, means for cooling the latter surface of said body to provide a temperature gradient across said surfaces, and to set the temperature of said ferroelectric material below and in the region of the Curie point temperature thereof, and means responsive to the capacitance of said temperature sensitive element for indicating the temperature of the adjacent surface of said body from which measurement the high temperature can be obtained in conjunction with other known quantities associated with said device.

5. Apparatus for measuring temperature with a temperature responsive element which cannot operate at such high temperatures, said apparatus comprising: a body having a cavity therein, a thermally responsive ferroelectric material lining said cavity and having a pair of terminals across which a variation in an electrical characteristic appears with variation in temperature, means for cooling said cavity for providing a temperature gradient between the outside of said body and the surface of said cavity, and means for measuring the electrical characteristic of said ferroelectric material.

6. Apparatus for measuring temperature with a temperature responsive element which cannot operate at such high temperatures, said apparatus comprising: a body having a cavity therein, a non-polarized ferroelectric material lining said cavity whose capacitance varies with temperature and having a pair of terminals across which a variation in capacitance appears with variation in temperature, means for cooling said cavity for providing a temperature gradient between the outside of said body and the surface of said cavity, and for setting the temperature of said ferroelectric material below its Curie point temperature and means for measuring the capacitance of said ferroelectric material.

7. Apparatus for measuring temperature with a temperature responsive element which cannot operate at such high temperatures, said apparatus comprising: a body of material having an outer surface to be subjected to said temperature and an inner surface isolated therefrom, a non-polarized ferroelectric layer of material disposed in said body and having a pair of terminals across which the variation in an electrical characteristic thereof appears with variation in temperature, means for circulating a coolant along said inner body surface for providing a temperature gradient between the outside of said body and said surface, and means for measuring the electrical characteristic of said ferroelectric material.

8. Apparatus for measuring high temperature comprising: a thick-walled hollow body made of a material which is a relatively poor conductor of heat at the temperatures to which said body is to be subjected, means for circulating a coolant in said hollow body for providing a substantial temperature gradient across the outer and inner surfaces of said hollow body, and means for measuring the temperature inside said hollow body at a point where the temperature is substantially below the temperature on the outside of said hollow body whereby the temperature on the outside of said body can be determined from the measured temperature and other known quantities associated with said apparatus.

9. In combination, a high temperature environment, and a device for measurement of the temperature of said environment comprising: an open-end housing made of a heat insulation material, a pair of slabs of heat insulating material of substantially the same coefficient of thermal conductivity within said housing, the open end of said housing being inserted in said source of high temperature such that only the outer surface of one of said pair of slabs is subjected directly to said high temperature environment, a first temperature sensitive element sandwiched between said slabs and which is thin relative to said slabs, means for cooling the outer surface of the slab which is remote from said high temperature environment to provide a temperature gradient through the slabs, and means responsive to said temperature sensitive element for measuring the temperature of the surfaces of said slabs contiguous to the temperature sensitive element.

10. In combination, a high temperature environment, and a device for measurement of the temperature of said environment comprising: an open end housing made of a heat insulation material, a pair of slabs of heat insulating material of substantially the same coefficient of thermal conductivity within said housing, said slabs having a much higher coefficient of thermal conductivity than said housing, the open end of said housing being inserted in said source of high temperature such that only the outer surface of one of said pair of slabs is subjected directly to said high temperature environment, a first temperature sensitive element sandwiched between said slabs and which is thin relative to said slabs, a second temperature sensitive element made of a heat insulation material which is thin relative to said slabs, the latter element being in contact with the outer surface of said slab remote from said high temperature environment, means for cooling the latter surface to provide a temperature gradient through the slabs, and means responsive to said temperature sensitive elements for measuring the temperature of the surfaces of said slabs contiguous to the temperature sensitive element.

11. Apparatus for measuring high temperatures with a temperature responsive element which cannot operate at such high temperatures, said apparatus comprising: a thick-walled body made of a refractory material having poor heat and electrical conductivity relative to metal, said body having a cavity therein isolated from the portion of the body which is to be subjected to such high temperature, means for feeding a coolant into and out of said cavity for providing a substantial temperature drop between the outside of said hollow body and with the defining wall surface of said cavity, means for stabilizing the temperature of the coolant flowing into the cavity, means for controlling the rate of flow of the coolant circulating in said cavity, an electrical temperature-responsive element in said body at a point where the temperature is substantially below the high temperature on the outside of said hollow body, and means responsive to said electrical temperature-responsive element for indicating the temperature of said point within said hollow body, whereby temperature on the outside of said hollow body can be determined from other known quantities and the measured temperature.

12. A device for measurement of temperature comprising a closed hollow body, a temperature sensitive element within said closed hollow body of substantially the same shape thereof and in contact with the inner surface thereof, means for feeding coolant into and out of the interior of said closed hollow body to provide a temperature gradient between the inside and outside of said hollow body, and means responsive to said temperature sensitive element for indicating the temperature in said body.

13. A device for measurement of high temperature comprising a first closed hollow body, a temperature sensitive element lining the inside of said first closed hollow body, a second hollow body located and being within said temperature sensitive element of the same material and substantially the same shape thereof and in contact with the inner surface thereof, means for feeding coolant into and out of the interior of said second hollow body, means for measuring the temperature within the interior of said second hollow body, and means responsive to said temperature sensitive element for indicating the temperature thereof.

14. A device as recited in claim 13 wherein said first and second hollow bodies are spherical in shape.

15. A method of measuring high temperatures comprising the steps of: passing a coolant through a hollow body to provide a temperature gradient through the body walls, placing the hollow body in a calibration temperature environment, adjusting the temperature of the calibration environment to a number of predetermined temperatures and, while maintaining the input coolant temperature at a given predetermined level, adjusting the flow rate of the coolant to maintain a fixed temperature on the inside of said hollow body at the various calibration temperatures of said calibration environment, preparing a calibration curve with the calibration temperature and flow rate variables as the orthogonal scales for the curve, then placing the hollow body in an unknown temperature environment and, while maintaining the input coolant temperature at said predetermined temperature, adjusting the flow rate to provide a temperature on the inside of said hollow body equal to said predetermined temperature, and determining the unknown outside temperature from said calibration curve.

References Cited in the file of this patent

UNITED STATES PATENTS

| | | |
|---|---|---|
| 430,271 | Cooper | June 17, 1890 |
| 2,027,405 | Smede | Jan. 14, 1936 |
| 2,054,382 | Larsen et al. | Sept. 15, 1936 |
| 2,648,823 | Kock et al. | Aug. 11, 1953 |
| 3,018,663 | Dunlop | Jan. 30, 1962 |